US010738194B2

(12) United States Patent
Mersch et al.

(10) Patent No.: US 10,738,194 B2
(45) Date of Patent: Aug. 11, 2020

(54) COMPOSITE PIGMENTS CONTAINING CALCIUM PHOSPHATE AND METHOD FOR THEIR MANUFACTURE

(71) Applicant: Kronos International, Inc., Leverkusen (DE)

(72) Inventors: Frank Mersch, Leichlingen (DE); Uwe Wilkenhoener, Wuppertal (DE)

( * ) Notice: Subject to any disclaimer, the term of this patent is extended or adjusted under 35 U.S.C. 154(b) by 319 days.

(21) Appl. No.: 14/563,595

(22) Filed: Dec. 8, 2014

(65) Prior Publication Data

US 2015/0166793 A1 Jun. 18, 2015

(30) Foreign Application Priority Data

Dec. 13, 2013 (EP) .................................... 13005813

(51) Int. Cl.
| | |
|---|---|
| *C09C 1/36* | (2006.01) |
| *C09C 1/00* | (2006.01) |
| *C09C 1/02* | (2006.01) |
| *C09C 3/06* | (2006.01) |
| *F16D 25/08* | (2006.01) |

(52) U.S. Cl.
CPC .......... *C09C 1/3653* (2013.01); *C09C 1/0081* (2013.01); *C09C 1/0084* (2013.01); *C09C 1/02* (2013.01); *C09C 1/36* (2013.01); *C09C 1/3661* (2013.01); *C09C 3/063* (2013.01); *F16D 25/087* (2013.01); *C01P 2004/03* (2013.01); *C01P 2004/61* (2013.01); *C01P 2004/62* (2013.01); *C01P 2004/64* (2013.01); *C01P 2004/80* (2013.01)

(58) Field of Classification Search
CPC . C09C 1/36; C09C 1/3653; C09C 2200/1004; C01P 2004/61; C01P 2004/80
See application file for complete search history.

(56) References Cited

U.S. PATENT DOCUMENTS

| | | | |
|---|---|---|---|
| 2004/0171505 A1* | 9/2004 | Nonami et al. ................ | 510/302 |
| 2005/0175788 A1* | 8/2005 | Nonami ..................... | 427/430.1 |
| 2008/0166575 A1* | 7/2008 | Nittel et al. .................. | 428/457 |

FOREIGN PATENT DOCUMENTS

| | | |
|---|---|---|
| DE | 1792118 | 10/1971 |
| DE | 10057294 | 6/2002 |
| DE | 102006012564 | 9/2007 |

(Continued)

*Primary Examiner* — Pegah Parvini

(57) ABSTRACT

The invention relates to composite pigment particles containing calcium phosphate, their manufacture and their use in coatings, plastics and laminates. The composite pigment particles contain titanium dioxide pigment particles and precipitated calcium phosphate. In one embodiment, the composite pigment particles additionally contain an inorganic and/or organic filler as an extender, preferably selected from the group comprising Ca, Ca—Mg and Mg carbonates, natural and synthetic silicon dioxide and oxides. The composite pigment particles are manufactured in a combined process of dispersion and precipitation. Depending upon the combination selected, use of composite titanium dioxide pigment particles of the invention can provide improved optical properties such as tinting strength or permits pigment savings with little to no loss of optical properties. In particular, the composite pigment particles of the invention can be used to replace part or all of the titanium dioxide contained in the user's system.

24 Claims, 2 Drawing Sheets

(56) References Cited

FOREIGN PATENT DOCUMENTS

| | | |
|---|---|---|
| EP | 0861299 | 5/1997 |
| EP | 0956316 | 9/1997 |
| EP | 1354628 | 10/2003 |
| JP | 2003-275600 | 9/2003 |
| WO | WO 97/18268 | 5/1997 |
| WO | WO 97/32934 | 9/1997 |
| WO | WO 99/35193 | 7/1999 |
| WO | WO 00/01771 | 1/2000 |
| WO | WO 2007/120810 | 10/2007 |
| WO | WO 2011/081874 | 7/2011 |
| WO | WO 2014/000874 | 1/2014 |

* cited by examiner

COMPOSITE PIGMENTS CONTAINING CALCIUM PHOSPHATE AND METHOD FOR THEIR MANUFACTURE

RELATED APPLICATIONS

This application claims the benefit of EP Patent App. No. 13005813.3 filed Dec. 13, 2013.

BACKGROUND

1. Field of the Invention

The invention relates to composite pigments containing calcium phosphate and having high weather and chemical resistance, their manufacture and their use in coatings, plastics and particularly in paper and laminates.

2. Technological Background of the Invention

Inorganic pigments, and particularly titanium dioxide pigments, are often incorporated into various matrices as whiteners, tinting agents or opacifiers. Owing to its high refractive index, titanium dioxide scatters light particularly efficiently and is therefore the most important white pigment for applications in paints and coatings, plastics, paper and fibers. The light-scattering efficiency declines if the titanium dioxide particles are distributed in the matrix at a distance of less than roughly half the wavelength of the light from each other, i.e. roughly 0.20 to 0.25 µm. The light-scattering efficiency is typically measured with the help of the hiding power or the tinting strength of the titanium dioxide pigment in the matrix.

On the other hand, titanium dioxide is a significant cost factor, and a search has been in progress for some time to find possibilities for reducing the quantity of titanium dioxide used, without having to accept significant losses of hiding power.

Savings are possible by combining titanium dioxide particles with suitable fillers that, as so-called "extender particles", are intended to act as spacers for the $TiO_2$ particles. The known methods include both simple blending of the components, and also bonding of the $TiO_2$ particles to the extender particles by means of a precipitated binder, or in-situ precipitation of the extender on the surface of the titanium dioxide particles. Methods are moreover known for distributing the fine titanium dioxide particles on coarser extender particles.

Only selected publications from the extensive available prior art are cited below.

WO 1999/035193 A1, for example, describes the manufacture of a pigment blend consisting of titanium dioxide and an inorganic extender ("spacer"), such as $SiO_2$ or $CaCO_3$, for use in the manufacture of paper.

DE 10 057 294 C5 discloses a pigment blend consisting of titanium dioxide and talcum for use in base decor paper.

EP 0 861 299 B1 discloses a titanium dioxide pigment that is coated with inorganic nanoparticles, such as colloidal silica, and a layer consisting of in organic oxides, such as aluminum, silicon or zirconium oxide, where the inorganic oxide layer is either located between the titanium dioxide surface and the nanoparticles, or forms the outer coating. The inorganic nanoparticles are $SiO_2$, $Al_2O_3$ or $CaCO_3$.

DE 10 2006 012 564 A1 discloses titanium dioxide pigment particles, on whose surface hollow microspheres and an aluminum oxide/aluminum phosphate coating are located.

In the method according to EP 0 956 316 B1, pigment particles and precipitated calcium carbonate (PCC) are mixed together in an aqueous phase, so as to produce a composite pigment where the carbonate particles, with a particle size of 30 to 100 nm, are attached to the surface of the pigment particles. The composite pigment contains 30 to 90% by weight precipitated calcium carbonate.

DE 1 792 118 A1 discloses the in-situ precipitation of calcium carbonate in a titanium dioxide pigment suspension by mixing of a calcium chloride and a sodium carbonate solution, where one of these solutions contains titanium dioxide pigment. This results in composite calcium carbonate/titanium dioxide particles.

WO 2000/001771 A1 discloses a composite pigment that contains inorganic particles having a particle size of roughly 1 to 10 µm, and to the surface of which titanium dioxide pigment particles are attached as a result of their opposite surface charge. Production takes place in an aqueous phase. The inorganic particles are selected from common extenders, such as kaolin, clay, talcum, mica or carbonates.

WO 2014/000874 A1 discloses a composite pigment that contains titanium dioxide and a particulate material as an extender, as well as calcium carbonate that is precipitated in the production process. The composite particles are manufactured in a combined process of dispersion and precipitation. The composite pigment is suitable for use in coatings, plastics and laminates.

BRIEF DESCRIPTION OF THE INVENTION

The object of the invention is to create an alternative composite pigment that displays high weather resistance and chemical resistance, and achieves at least the same hiding power, particularly in comparison with pure titanium dioxide. The object furthermore consists in indicating a method for manufacture.

The object is solved by a composite pigment containing calcium phosphate, comprising titanium dioxide pigment particles and precipitated, particulate crystalline calcium phosphate in quantities of at least 10% by weight, preferably at least 30% by weight, and particularly at least 50% by weight, referred to composite pigment, where the precipitated calcium phosphate displays a particle size of at least 200 nm.

The object is moreover solved by a method for manufacturing composite pigment particles containing calcium phosphate, comprising the steps:

a) Provision of an aqueous suspension containing inorganic pigment particles, and provision of a calcium source and a phosphorus source, b) Combination of the components—suspension of inorganic pigment particles, calcium source and phosphorus source—in any order, c) Precipitation of particulate calcium phosphate, such that composite pigment particles are formed that contain calcium phosphate in quantities of at least 10% by weight, preferably at least 30% by weight, and particularly at least 50% by weight, referred to composite pigment, d) Separation of the composite pigment particles from the suspension.

Further advantageous embodiments of the invention are indicated in the sub-claims.

BRIEF DESCRIPTION OF THE DRAWINGS

For a more complete understanding of the present invention and for further advantages thereof, reference is now made to the following description taken in conjunction with the accompanying drawings in which.

DESCRIPTION OF THE PREFERRED EMBODIMENT

Figure 1:
FIG. 1 is a scanning electron microscope image of composite pigment particles according to Example 1.

The present invention can be better understood by the following discussion of the manufacture and use of certain preferred embodiments. All data disclosed below regarding size in μm etc., concentration in % by weight or % by volume, pH value, etc. are to be interpreted as also encompassing all values lying within the respective measuring accuracy known to the person skilled in the art. Unless otherwise stated, technical grades of the various materials were used in the preferred embodiments. The term "substantially free" is intended to connote that the particular material is not detected (i.e. is below the detection limit) using standard commercial tests and methodologies used in the industry as of the earliest priority date of this application.

The composite pigment particles according to the preferred embodiment contain titanium dioxide pigment particles and in-situ precipitated calcium phosphate particles. Within the scope of the invention calcium phosphate is to be taken to mean calcium orthophosphate or anhydrous or hydrous calcium monohydrogen phosphate. Included are e.g., brushite, monetite, and apatite. The precipitated calcium phosphate particles form discrete particles and/or particle agglomerates and act as carriers for the pigment particles or as spacers (extenders). The composite particles according to the invention are moreover characterized by the fact that a strong bond exists between the carrier or extender particle and the pigment particle, this bond being very difficult to break during further, customary processing by the user, e.g. during dispersion in a dissolver or an inline disperser. This distinguishes the composite pigment according to the invention from known pigment/extender blends.

The titanium dioxide pigment particles used in the framework of the preferred embodiment of the current invention display a mean particle size of roughly 100 nm to roughly 1 μm, preferably 200 nm to 400 nm.

Surface-treated titanium dioxide pigment particles or untreated titanium dioxide pigment particles, known as titanium dioxide base material, can generally be used. Untreated titanium dioxide base material particles are preferably used, particularly titanium dioxide base material particles from the chloride process. The titanium dioxide pigment particles can be doped, preferably with aluminum. It is particularly advantageous in economic terms to use non-sand-milled, non-dechlorinated titanium dioxide base material particles manufactured by the chloride process. Alternatively, it is also possible to use sand-milled, dechlorinated titanium dioxide base material particles from the chloride process or sand-milled titanium dioxide base material particles from the sulfate process.

The calcium phosphate particles are predominantly crystalline. They display a particle size of at least 0.2 μm, preferably at least 0.5 μm, and particularly at least 1.0 μm. In a special embodiment of the invention, the calcium phosphate particles are larger than the titanium dioxide pigment particles. The calcium phosphate particles are both primary particles and particle agglomerates.

The composite particles according to the preferred embodiment preferably contain at least 10% by weight calcium phosphate, particularly at least 30% by weight, particularly preferably 50% by weight. The pigment content of the composite particles is preferably 10 to 90% by weight.

This distinguishes the composite pigment according to the preferred embodiment from known titanium dioxide particles provided with a calcium phosphate coating precipitated in situ, e.g. to improve the photocatalytic properties (EP 1 354 628 A1) or for use as anti-corrosion pigments (WO 2011/081874 A1).

In a special embodiment of the invention, the composite pigment additionally contains at least one further inorganic extender and/or at least one organic extender. The inorganic extender can be selected from the group comprising natural and synthetic silicates (e.g. talcum, kaolin, mica, mullite, quartz, silica gels, precipitated silicic acid, fumed silica, silicon dioxide, surface-treated silicon dioxide), carbonates (e.g. natural or precipitated calcium or magnesium carbonate, dolomite), sulfates (e.g. natural or precipitated calcium and barium sulfate), oxides/hydroxides (e.g. aluminum oxide, aluminum hydroxide, magnesium oxide), natural minerals, such as basalt and pumice dust, perlites and further extenders known to the person skilled in the art (e.g. wollastonite, feldspars, mica, fibrous extenders, glass dust, etc.).

The further extender preferably displays a particle size of roughly 0.1 to 30 μm, particularly roughly 1 to 10 μm. The further extender can be present in quantities of 10 to 90% by weight, preferably 20 to 80% by weight, and particularly 30 to 70% by weight.

The composite pigment particles according to the preferred embodiment contain the pigment in ideally dispersed form and thus lead to an increase in the light-scattering efficiency of the titanium dioxide pigment in the user's system. This makes it possible to save that portion of the pigment that is usually not ideally dispersed, but present in "flocculated" form, in the user's system. The composite pigment particles lead to improved hiding power in the user's system if the quantity of pigment remains unchanged, or they permit reduction of the pigment content in the user's system while retaining an unchanged hiding power.

The composite pigment particles according to the preferred embodiment can be produced by combining the components aqueous suspension of titanium dioxide pigment particles, calcium source and phosphorus source.

An aqueous suspension of titanium dioxide pigment particles is provided first. The titanium dioxide pigment particles display a mean particle size of roughly 100 nm to roughly 1 μm, preferably 200 nm to 400 nm. The titanium dioxide pigment particles can be surface-treated or untreated—so-called titanium dioxide base material. They can, for example, be titanium dioxide base material from the sulfate process or the chloride process. Particularly suitable are milled or unmilled, and possibly non-dechlorinated, titanium dioxide base material particles manufactured by the chloride process. Likewise suitable are sand-milled titanium dioxide base material particles from the sulfate process.

A calcium source is furthermore provided. The calcium source can be calcium carbonate, calcium phosphate (e.g. apatite) or a soluble calcium salt, such as calcium chloride, calcium nitrate, or burnt or slaked lime. If calcium carbonate is used as the calcium source, it can be a commercially customary variety of calcium carbonate known to the person skilled in the art. The calcium carbonate used advantageously has a high degree of whiteness. The particle size is up to several mm. Natural calcium carbonate in the form of limestone, chalk or marble dust is preferably used.

A phosphorus source is furthermore provided. Suitable as the phosphorus source are, for example, phosphoric acid, phosphates, hydrogenphosphate, dihydrogenphosphate and polyphosphates.

The components—suspension of titanium dioxide pigment particles, calcium source and phosphorus source—can be combined in any desired order.

One embodiment of the invention starts with the aqueous suspension of titanium dioxide pigment particles. The calcium source and the phosphorus source are added to the suspension, the order in which the calcium source and the phosphorus source are added being arbitrary.

Following addition of the calcium source and the phosphorus source, the suspension preferably displays a pH value of <3, particularly of <2. If appropriate, the pH value can be set by additional admixing of a pH-controlling substance, such as an acid, a lye or a corresponding salt.

In an alternative embodiment of the invention, an aqueous mixture of the calcium source and the phosphorus source is first prepared, the titanium dioxide pigment particles subsequently being added. The procedure is as described above in all other respects.

A further embodiment of the invention can also start with an aqueous solution or suspension of the calcium source, to which the pigment particles and, finally, the phosphorus source are added. Correspondingly, a start can also be made with an aqueous solution of the phosphorus source, to which the pigment particles and, finally, the calcium source are added.

The precipitation of calcium phosphate is subsequently initiated, and composite pigment particles containing calcium phosphate are formed. The precipitation of calcium phosphate is induced either by increasing the pH value to >2 and/or by increasing the temperature to >50° C., preferably >60° C. The pH value can be increased by adding a pH-controlling substance, e.g. NaOH or $Ca(OH)_2$. The precipitated calcium phosphate is predominantly crystalline and particulate. The particles are both primary particles and particle agglomerates.

The person skilled in the art knows that the particle size of the precipitated calcium phosphate can be controlled by varying the precipitation conditions, such as temperature, pH profile and addition rate, and by adding precipitation-promoting substances, e.g. crystal nuclei, magnesium ions or organic substances. According to the invention, the particles display a particle size of at least 0.2 µm, preferably at least 0.5 µm, and particularly at least 1.0 µm. In a special embodiment of the invention, the calcium phosphate particles are larger than the titanium dioxide pigment particles.

The quantities of phosphate and calcium are selected in such a way that the composite pigment particles formed preferably contain at least 10% by weight calcium phosphate, particularly at least 30% by weight, and particularly preferably at least 50% by weight. The $TiO_2$ content of the composite pigment particles is preferably 10 to 90% by weight.

In a special embodiment of the invention, at least one further inorganic extender and/or at least one organic extender is added to the suspension. The inorganic extender can be selected from the group comprising natural and synthetic silicates (e.g. talcum, kaolin, mica, mullite, quartz, silica gels, precipitated silicic acid, fumed silica, silicon dioxide, surface-treated silicon dioxide), carbonates (e.g. natural or precipitated calcium or magnesium carbonate, dolomite), sulfates (e.g. natural or precipitated calcium and barium sulfate), oxides/hydroxides (e.g. aluminum oxide, aluminum hydroxide, magnesium oxide), natural minerals, such as basalt and pumice dust, perlites and further extenders known to the person skilled in the art (e.g. wollastonite, feldspars, mica, fibrous extenders, glass dust, etc.).

The further extender preferably displays a particle size of roughly 0.1 to 30 µm, particularly roughly 1 to 10 µm. The further extender can be added in quantities of 10 to 90% by weight, preferably 20 to 80% by weight, and particularly 30 to 70% by weight, referred to composite pigment particles.

Finally, the composite pigment particles are separated from the suspension, washed and dried.

The effectiveness of the titanium dioxide pigment, i.e. the light-scattering efficiency, can be optimized, depending on the required quality of the product manufactured with the composite pigment particles (coating, plastic, paper, laminate, etc.). Savings on pigment, achieved due to its more effective use in the composite pigment particle, result in an economic advantage, compared to the separate use of extender and pigment. Use of the composite pigment particles manufactured according to the invention in the user's system permits pigment savings of up to 30%, preferably 15 to 30%, the optical properties remaining unchanged.

In particular, the composite pigment can be used to partially or completely replace pure titanium dioxide pigment.

A further advantage of the composite pigment particles according to the invention lies in the weather and chemical resistance brought about by the calcium phosphate. This makes the composite pigment particles particularly suitable for use in laminates and paper.

A further advantage lies in the fact that the titanium dioxide present in the composite pigment particles is already well-dispersed, meaning that energy can be saved during dispersion in a paint system, for example. The composite pigment particles are coarser, compared to pure pigment, and need less energy for dispersion and milling, as well as smaller quantities of dispersant. This yields a further advantage for the paint manufacturer.

In a further embodiment of the method according to the invention, the composite pigment particles according to the invention can be treated with inorganic compounds, such as $SiO_2$ or $Al_2O_3$, of the kind customarily used in the production of titanium dioxide pigments. The person skilled in the art is familiar with the corresponding compounds and procedures.

In a special embodiment of the method according to the invention, organic additives can additionally be added, preferably in quantities of 0.05 to 30% by weight, preferably 0.5 to 10% by weight, referred to pigment/extender blend. The organic additives can be added in both solid and liquid form. Suitable as organic additives are, on the one hand, commercially available, wax-like additives with or without further chemical functionalization. Also suitable, on the other hand, are familiar dispersants or other auxiliaries customary in paint technology, e.g. for rheology, defoaming, wetting, etc.

The composite pigment particles according to the invention are suitable for use in coatings, plastics, paper and laminates for improving the light-scattering efficiency of the titanium dioxide pigment.

EXAMPLES

The invention is described in more detail on the basis of the following examples, although this is not to be taken as a limitation of the scope of the invention.

Example 1

50 g calcium carbonate (marble dust) were added to 250 ml 20% phosphoric acid with a temperature of 25° C. while stirring. A further 100 ml 20% phosphoric acid were subsequently added, such that a pH value of 1.3 was obtained. Large quantities of gas were generated during the reaction. A thin sediment of calcium phosphate was formed.

80 ml of an aqueous suspension of untreated titanium dioxide pigment particles with a concentration of 600 g/l $TiO_2$ were subsequently added while stirring. A pH value of 1.8 was obtained. 63.7 g calcium hydroxide were subsequently added while stirring, in which context a pH value of 3.5 was obtained and calcium phosphate precipitated. The composite pigment particles were subsequently separated out by filtration, washed and dried.

Figure 2:
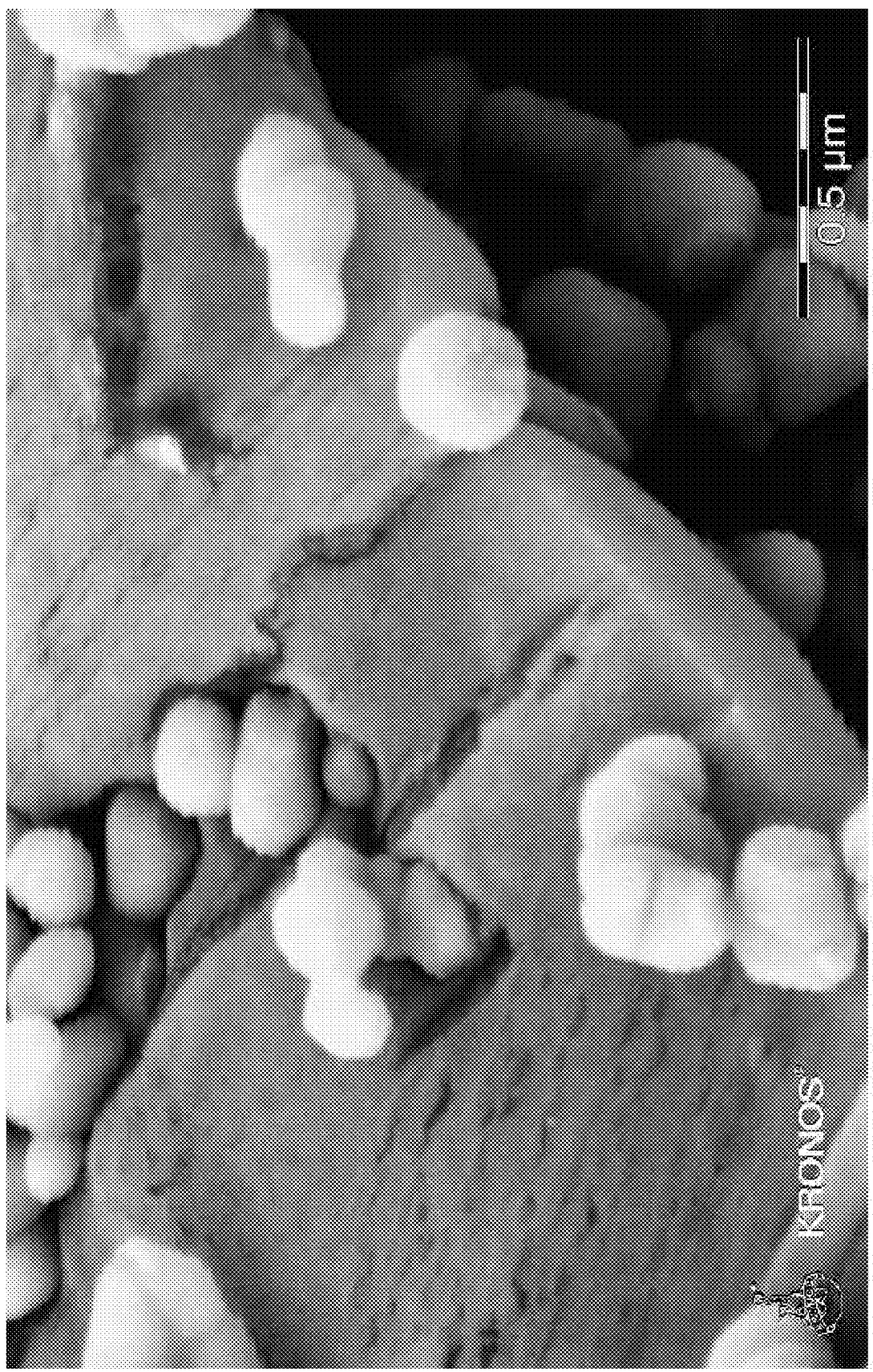
FIG. 2 is a second scanning electron microscope image of composite pigment particles according to Example 1.

The composite pigment particles were examined under the scanning electron microscope (FIGS. 1, 2). They essentially consist of large calcium phosphate crystals (>5 μm), on the surface of which titanium dioxide particles are fixed (FIGS. 1, 2), or which grow around the titanium dioxide particles (FIG. 2).

Example 2

Composite pigment particles were produced according to example 1 with the only difference that commercial titanium dioxide pigment KRONOS 2310 was used instead of untreated titanium dioxide pigment particles. The composite pigment particles produced contained 45% by weight titanium dioxide pigment KRONOS 2310 and 55% by weight calcium phosphate. The calcium phosphate consisted mainly of calcium monohydrogen phosphate and brushite (calcium monohydrogen phosphate dihydrate).

The composite pigment particles were subsequently incorporated into an interior emulsion paint (test paint) having the formulation indicated in Table 1, where part of the $TiO_2$ pigment KRONOS 2310 was replaced by the composite pigment particles according to example 2, so that the net $TiO_2$ pigment content was reduced by 10% by weight (ex. 2-1), reduced by 20% by weight (ex. 2-2), reduced by 30% by weight (ex. 2-3), each referred to $TiO_2$ pigment. The pigment volume concentration (PVC) of the test paint was 78%.

As a reference example, the interior emulsion paint was produced using only the commercial $TiO_2$ pigment KRONOS 2310 without composite pigment particles (reference example).

TABLE 1

| Formulation of the white interior emulsion paint (test paint) | |
|---|---|
| Water | 17.75% by weight |
| Calgon N neu (dispersant) | 0.05% by weight |
| Dispex N 40 (dispersant) | 0.30% by weight |
| Agitan 315 (defoamer) | 0.20% by weight |
| Acticid MBS (algicide/fungicide) | 0.40% by weight |
| $TiO_2$ pigment (KRONOS 2190) | 22.00% by weight |
| Steamat (extender) | 7.00% by weight |
| Socal $P_2$ (extender) | 2.00% by weight |
| Omyacarb 2-GU (extender) | 11.80% by weight |
| Omyacarb 5-GU (extender) | 15.50% by weight |
| Celite 281 SS (extender) | 2.00% by weight |
| Tylose paste 3% (cellulose) | 0.30% by weight |
| Mowilith LDM 1871 (binder) | 11.00% by weight |

The test paint was tested for its contrast ratio (CR) and tinting strength (TS). The test results are compiled in Table 2.

TABLE 2

| White interior emulsion paint | | | |
|---|---|---|---|
| | Contrast ratio (mean 80-125 μm) | Tinting strength (standardized) | net $TiO_2$ pigment content [% by weight] |
| Example 2-1 | 96.7 | 101 | 19.8 |
| Example 2-2 | 96.5 | 100 | 18.7 |
| Example 2-3 | 96.3 | 97 | 17.6 |
| Reference example | 95.6 | 100 | 22.0 |

Test Methods

To determine the contrast ratio, the white interior emulsion paint (test paint) produced in accordance with the specified formulation was applied to Morest charts with grooved doctor blades (80-125 μm) by means of an automatic film applicator at a speed of 12.5 mm/s. The Y over black background ($Y_{(black)}$) and Y over white background ($Y_{(white)}$) colour values were then measured three times each with the Color-view spectrophotometer. The contrast ratio was calculated according to the following formula:

$$CR\ [\%] = Y_{(black)}/Y_{(white)} \times 100$$

To determine the tinting strength (TS) 50 g of the test paint produced in accordance with the specified formulation was mixed with 0.5 g of the carbon black paste Colanyl Black PR 130 and was applied to Morest cards by means of a doctor blade (groove 100 μm). The reflectance values of the film are measured with a Byk-Gardner Color View. The TS values derived therefrom are referred to the reference example as a standard.

As can be seen from the examples, depending on the combination selected, the use of composite pigment particles according to the invention, consisting of calcium phosphate and titanium dioxide pigment, permits pigment savings with little or no loss of optical properties. Alternatively, if the pigment content remains unchanged, it is also possible to achieve better values, particularly for tinting strength.

The invention claimed is:

1. A composite pigment containing calcium phosphate, comprising:
   titanium dioxide pigment particles having an average primary particle size from about 200 nm to about 400 nm;
   precipitated, particulate crystalline calcium phosphate in quantities of at least about 10% by weight, referred to the composite pigment; and
   wherein the precipitated calcium phosphate has a particle size of at least about 0.2 μm.

2. The composite pigment of claim 1 wherein the precipitated, particulate crystalline calcium phosphate is present in quantities of at least about 30% by weight, referred to the composite pigment.

3. The composite pigment of claim 2 wherein the precipitated, particulate crystalline calcium phosphate is present in quantities of at least about 50% by weight, referred to the composite pigment.

4. The composite pigment of claim 1 wherein the titanium dioxide particles are from about 10 to about 90% of the composite pigment by weight.

5. The composite pigment of claim 1 wherein the precipitated calcium phosphate has a particle size of at least about 0.5 μm.

6. The composite pigment of claim 5 wherein the precipitated calcium phosphate has a particle size of at least about 1 μm.

7. The composite pigment of claim 1 wherein the calcium phosphate particles are larger than the titanium dioxide particles.

8. The composite pigment of claim 1 further comprising at least one inorganic or organic extender.

9. The composite pigment of claim 8 wherein the inorganic extender is selected from the group consisting of calcium, calcium-magnesium, magnesium carbonates, sulfates, natural phosphates, oxides, hydroxides, silicon oxide, silicates, aluminosilicates, perlites, glass dust, and combinations thereof.

10. The composition of claim 1 wherein the calcium phosphate is calcium orthophosphate.

11. The composite pigment of claim 1 wherein:
the precipitated calcium phosphate has a particle size of at least about 1 μm;
the calcium phosphate particles are larger than the titanium dioxide particles; and
the precipitated, particulate crystalline calcium phosphate is present in quantities of at least about 50% by weight, referred to the composite pigment.

12. A method for manufacturing the composite pigment particles containing calcium phosphate according to claim 1, comprising the steps:
a) providing an aqueous suspension containing titanium dioxide pigment particles having an average primary particle size from about 200 nm to about 400 nm, a calcium source, and a phosphorus source;
b) combining the aqueous suspension, calcium source and phosphorous source in any order;
c) Precipitating particulate, crystalline calcium phosphate, such that composite pigment particles are formed that contain calcium phosphate in quantities of at least about 10% by weight, referred to the composite pigment and wherein the precipitated calcium phosphate has a particle size of at least about 0.2 μm;
d) Separating the composite pigment particles from the suspension.

13. The method of claim 12 wherein the composite pigment particles contain calcium phosphate in quantities of at least about 30% by weight, referred to the composite pigment.

14. The composite pigment of claim 13 wherein the precipitated, particulate crystalline calcium phosphate is present in quantities of at least 50% by weight, referred to the composite pigment.

15. The method of claim 12 wherein the calcium source is a compound selected from the group consisting of calcium carbonate, calcium phosphate, soluble calcium salt, burnt and slaked lime, and mixtures thereof.

16. The method of claim 15 wherein the calcium carbonate is selected from the group consisting of limestone, marble dust or chalk, or mixtures thereof.

17. The method of claim 15 wherein the calcium source is selected from the group consisting of calcium chloride, calcium nitrate or mixtures thereof.

18. The method of claim 12 wherein the phosphorous source is a compound selected from the group consisting of phosphoric acid, phosphate, hydrogenphosphate, dihydrogenphosphate, polyphosphate and mixtures thereof.

19. The method of claim 12 wherein the precipitation step in induced by raising the pH value or increasing the temperature to greater than about 50° C.

20. The method of claim 12 further comprising the step of adding at least one inorganic or organic extender to the suspension of inorganic pigment particles.

21. The method of claim 12 further comprising the step of using the resulting composite pigment in a composition containing titanium dioxide and selected from the group consisting of coatings, plastics, paper and laminates to improve the light-scattering efficiency of the titanium dioxide pigment.

22. The method of claim 12 wherein the precipitated crystalline calcium phosphate is crystalline calcium orthophosphate.

23. The method of claim 12 wherein:
the precipitated, particulate crystalline calcium phosphate is present in quantities of at least 50% by weight, referred to the composite pigment;
the calcium source is a compound selected from the group consisting of calcium carbonate, calcium phosphate, soluble calcium salt, burnt and slaked lime, and mixtures thereof;
the phosphorous source is a compound selected from the group consisting of phosphoric acid, phosphate, hydrogenphosphate, dihydrogenphosphate, polyphosphate and mixtures thereof.

24. The method of claim 23 wherein the precipitated particulate, crystalline calcium phosphate has a particle size of at least about 1 μm and is larger in size than the titanium dioxide particles.

\* \* \* \* \*